(12) United States Patent
Widiaman et al.

(10) Patent No.: US 10,187,104 B2
(45) Date of Patent: Jan. 22, 2019

(54) PROTECTIVE JACKET FOR A DEVICE

(71) Applicant: HEWLETT-PACKARD DEVELOPMENT COMPANY, L.P., Houston, TX (US)

(72) Inventors: Rudy Widiaman, Houston, TX (US); Carla Ali-Napo, Houston, TX (US); Paul Roberto Lalinde, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/309,523

(22) PCT Filed: Jul. 28, 2014

(86) PCT No.: PCT/US2014/048511
§ 371 (c)(1),
(2) Date: Nov. 8, 2016

(87) PCT Pub. No.: WO2016/018238
PCT Pub. Date: Feb. 4, 2016

(65) Prior Publication Data
US 2017/0187409 A1 Jun. 29, 2017

(51) Int. Cl.
G06F 1/16 (2006.01)
H01R 13/52 (2006.01)
H04B 1/3888 (2015.01)

(52) U.S. Cl.
CPC ......... H04B 1/3888 (2013.01); G06F 1/1626 (2013.01); G06F 1/1656 (2013.01); G06F 1/1681 (2013.01); H01R 13/5213 (2013.01); G06F 2200/1633 (2013.01); H01R 2201/06 (2013.01)

(58) Field of Classification Search
CPC ..... H04B 1/385; H04B 1/3888; G06F 1/1626; G06F 1/1681
USPC ...................................................... 455/757.8
See application file for complete search history.

(56) References Cited

U.S. PATENT DOCUMENTS 6,002,581 A 12/1999 Lindsey
8,425,243 B2 4/2013 Alvarez Rivera
(Continued)

FOREIGN PATENT DOCUMENTS

KR        20030080134    10/2003
KR   10-2006-0112553 A   11/2006
(Continued)

OTHER PUBLICATIONS

"iPAQ Universal Wireless Rugged Case"; Dec. 2, 2004; 4 pages.
Gruber, R.; "HP Elitepad 900 Live Erleben"; May 27, 2013; 48 pages.

Primary Examiner — Yuwen Pan
Assistant Examiner — Fatuma G Sherif
(74) Attorney, Agent, or Firm — HPI Patent Department

(57) ABSTRACT

A protective jacket for a portable computing device in accordance with one example includes a cover movably attached to the jacket. The cover includes an inner portion to seal a plurality of connectors of the device when the cover is in a closed position. The cover also includes an outer portion to magnetically couple to magnetic members disposed within a surface of the jacket when the cover is in an open position.

14 Claims, 7 Drawing Sheets

(56) References Cited

U.S. PATENT DOCUMENTS

| | | | | |
|---|---|---|---|---|
| 8,807,333 B1* | 8/2014 | Cooper | ............... | A45C 11/00 |
| | | | | 206/320 |
| 2005/0124191 A1* | 6/2005 | Stanton | ............. | H01R 13/5213 |
| | | | | 439/135 |
| 2010/0134964 A1* | 6/2010 | Smith | ............... | B60R 11/0252 |
| | | | | 361/679.2 |
| 2011/0051329 A1* | 3/2011 | Huang | ............... | G06F 1/1613 |
| | | | | 361/679.01 |
| 2012/0314354 A1* | 12/2012 | Rayner | ............... | H01H 13/06 |
| | | | | 361/679.01 |
| 2013/0130524 A1 | 5/2013 | Wang | | |

FOREIGN PATENT DOCUMENTS

| | | |
|---|---|---|
| KR | 10-0798943 A | 1/2008 |
| KR | 10-2010-0122261 A | 11/2010 |
| KR | 10-1155196 A | 6/2012 |
| WO | WO-2012/174175 A2 | 12/2012 |

\* cited by examiner

PROTECTIVE JACKET FOR A DEVICE

BACKGROUND

The emergence and popularity of mobile computing has made portable computing devices a staple in today's marketplace, due to their compact design and light weight. Tablets computers are examples of portable computing devices that are widely used. Tablet computers generally employ a touchscreen on a display surface of the tablet that may be used for both viewing and input. Users of tables may interact with the touchscreen via finger or stylus gestures. As an example, an on-screen keyboard may be illustrated on the touchscreen surface for entering characters.

BRIEF DESCRIPTION OF THE DRAWINGS

Some examples of the present application are described with respect to the following figures.

DETAILED DESCRIPTION

Figure 1:
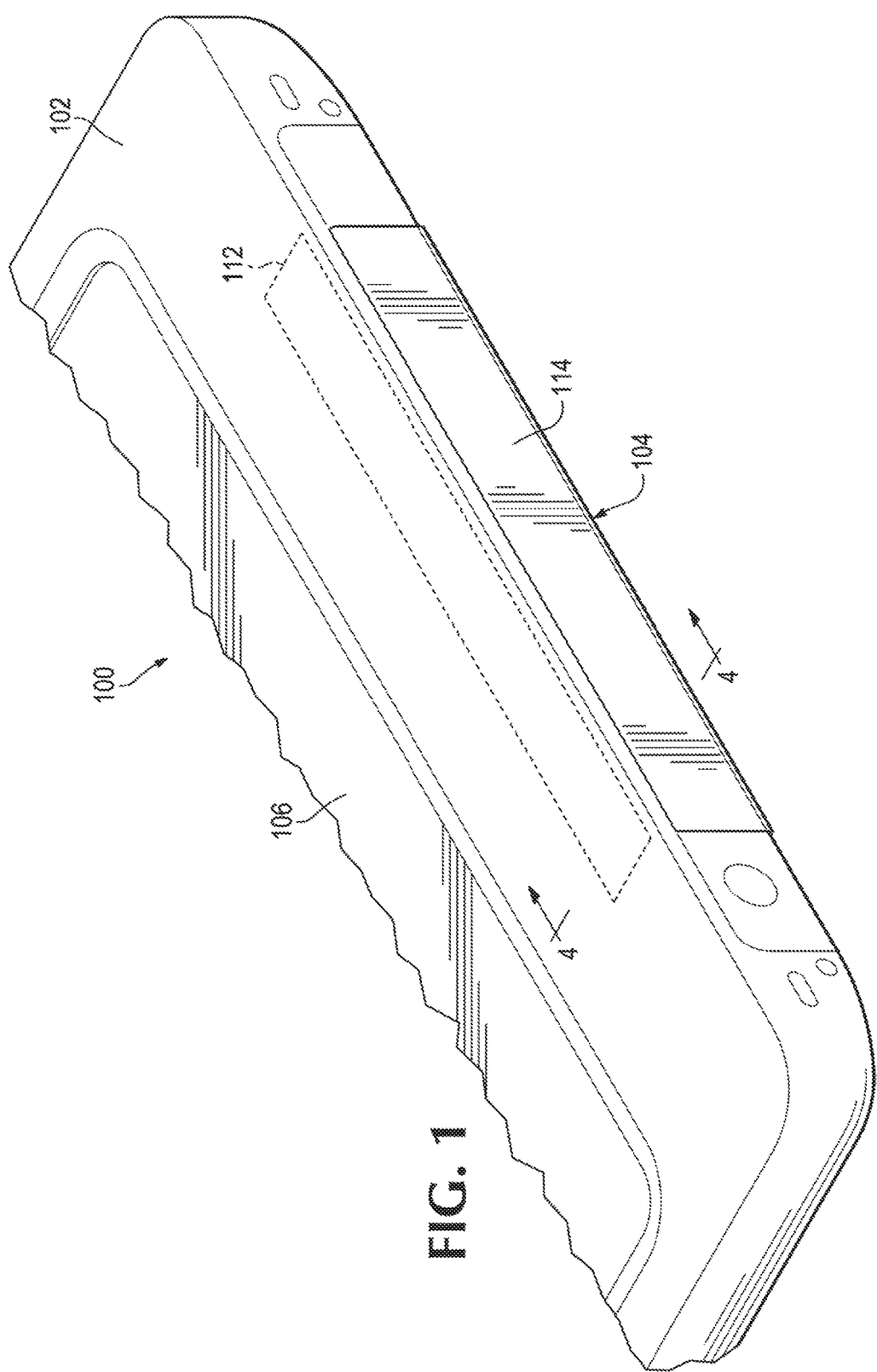
FIG. 1 illustrates a protective jacket for a portable computing devices, according to an example.

While using a portable computing device such as a tablet computer (or any other computing device), it may be desirable to protect the tablet computer via a protective jacket, such that the tablet computer is suitable for tough environments, for example. As an example, the protective jacket may prevent damage to the tablet computer from accidental drops and other external environmental conditions such as water/liquid, dirt, dust, and debris. The protective jacket may be used to cover various portions of the tablet computer, such as the display surface, the back surface opposite the display surface, and/or the sidewalls of the tablet computer. For example, the protective jacket may include an input/output (I/O) port cover or door to protect various ports/connectors (e.g., USB, HDMI, etc.) located on the sidewalk (e.g., bottom sidewall) of the tablet computer.

One of the challenges encountered with existing protective jackets is that such port/connector covers may be lost if they are not attached to the jacket. Even where the covers are movably attached to the jacket, they may be left dangling or hanging loose when the cover is in the open position to provide access to the ports/connectors and may be in the way of the user, thereby being cumbersome and bothersome to the user. Another challenge encountered with protective jackets is their inability to provide a high degree of protection from external environment such as water, liquids, dirt, dust, and debris. For example, in the healthcare industry, it may be desirable to have protective jackets that conform to at least a specific ingress protection (IP) standard marking or code.

The IP standard classifies and rates the degree of protection provided against the intrusion (including body parts such as hands and fingers), dust, accidental contact, and water by mechanical casings and electrical enclosures, and is published by the International Electrotechnical Commission (IEC). The standard is written as "IPXX," where the first digit indicates the level of protection that the enclosure provides against access to hazardous parts and the ingress of solid foreign objects, and where the second digit indicates the level of protection that the enclosure provides against harmful ingress of water.

Examples disclosed herein address the above challenges by providing a protective jacket for a computing device. The protective jacket includes a flip-back I/O port and connector cover. The cover is movably attached to the jacket and can flip open and snap onto the surface of the jacket, via a magnetic attraction, when the cover is opened such that the cover is not dangling or obstructive to the user. Further, the inner portion of the cover includes rubber members so seal the I/O ports and connectors from external environment. The cover conforms to at least an IP54 rating protection against solid and liquid ingress.

In one example, a protective jacket for a portable computing device includes a cover movably attached to the jacket. The cover includes an inner portion to seal a plurality of connectors of the device when the cover is in a closed position. The cover also includes an outer portion to magnetically couple to magnetic members disposed within a surface of the jacket when the cover is in an open position.

In another example, a protective jacket for enclosing a back surface and sidewalls of a portable computing device includes a cover movably attached to the jacket. The cover includes an inner portion including a rubber member to seal a plurality of connectors on a sidewall of the device when the cover is in a closed position. The cover also includes an outer portion including at least one of a metallic member and first magnetic member to magnetically couple to second magnetic members disposed within a surface of the jacket when the cover is in an open position.

In another example, a system includes a portable computing device including a display surface and a back surface opposite the display surface, and a protective jacket for enclosing at least the back surface and sidewalls of the device. The jacket includes a cover movably attached to a bottom portion of the jacket. The cover includes an inner portion including a rubber member to seal a plurality of connectors on a bottom side wall of the device when the cover is in a closed position. The cover also includes an outer portion including at least one of a metallic member and a magnetic member to couple to magnetic members disposed within a surface of the jacket when the cover is in an open position.

As used herein, "portable computing device" and "device" may be used interchangeably and refer to any one of various tablets, smartphones, cellular telephones, personal digital assistant (PDA), laptops, notebooks, "phablet" device (i.e., phone/tablet device), computers, and any other similar electronic devices. As used herein, "connectors(s)" include standard I/O ports (e.g., HDMI post, USB post, etc.) and male or female connectors (e.g., power connector, microphone connector, power connector, dock connector, etc.) that may be located on a sidewall (e.g., bottom sidewall) of the device that allow for communication and/or interaction with external devices or objects.

Referring now to the figures, FIG. 1 illustrates a protective jacket for a portable computing device, according to an example. Computing device 100 can be a tablet computer, for example. However, computing device 100 can be any portable computing device such as a laptop computer, a notebook computer, a mobile device (e.g., a smartphone), a "phablet" device (i.e., phone/tablet device), a hybrid computer, or any other portable computing device.

Device 100 can include a display surface 106 and a back surface opposite the display surface. The device 100 may include sidewalls around a perimeter of the device 100. As an example, the device 100 may include four (4) sidewalls (a left sidewall, a right sidewall, a top sidewall, and a bottom sidewall). Device 100 can be fitted with a jacket 102 for enclosing at least the back surface and sidewalls. For example, a portion of the bottom sidewall may be exposed via cover 104. Jacket 102 may be constructed from at least one of metal, plastic, fiber, resin, and any other suitable material.

In the example of FIG. 1, cover 104 is in a closed position, sealing the connectors located on the bottom sidewall of the device 100. Cover 104 is adapted to move to the open position and the closed position, as needed, while movably attached to the jacket 102. Cover 104 includes an outer portion 114 and an inner portion (not shown). Outer portion 114 of cover 104 can snap on to the surface of the jacket 102 and stowed on the surface of the jacket 102, via a magnetic attraction, when cover 104 is in the open position, thereby preventing cover 104 from dangling. Jacket 102 may include magnetic members 112 disposed within a surface of jacket 102 to magnetically attract to the outer portion 114 of cover 104. The magnetic members 112 may be located on the lower surface of the jacket above the cover 104.

In one example, outer portion 114 of cover 104 includes a metal member to create a magnetic attraction between the cover 104 and magnetic members 112 disposed within the surface of the jacket 102 when the cover 104 is in the open position. In another example, outer portion 114 of cover 104 includes magnetic member to create magnetic attraction between the cover 104 and the magnetic member 112 of the jacket 102 when the cover 104 is in the open position. In such an example, the magnetic members of the outer portion 114 of the cover 104 may have a different polarity than the magnetic members 112 of the jacket 102.

Cover 104 includes an inner portion (not shown) to seal the connectors of the device 100 when the cover 104 is in a closed position. In one example, the inner portion of the cover 104 includes a rubber member (e.g., rubber tabs) to seal the connectors from external environment such as liquids (e.g., water, chemicals, etc.), dust, dirt, and debris. In certain examples, jacket 102 complies with at least an IP54 rating.

Figure 2:
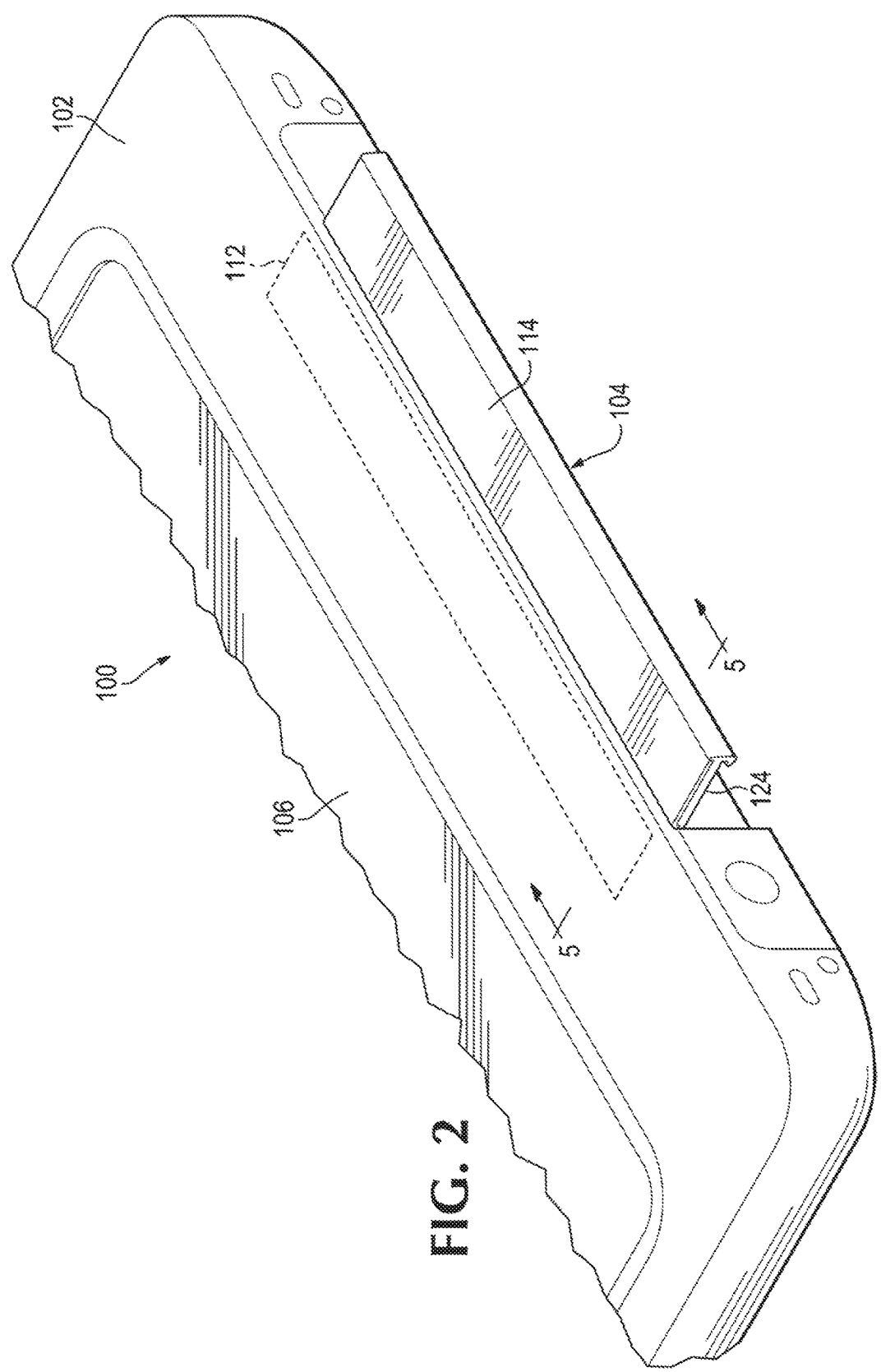
FIG. 2 illustrates a protective jacket for a portable computing device; according to an example.

FIG. 2 illustrates a protective jacket for a portable computing device, according to an example. In the example of FIG. 2, the cover 104 is partially open. Cover 104 includes an inner portion 124 and an outer portion 114. Inner portion 124 includes a rubber member to seal the connectors of the device 100 from external environment when the cover 104 is closed. Outer portion 114 can include a magnetic member or metallic member to magnetically couple to magnetic members 112 of the jacket when the cover is opened.

Figure 3:
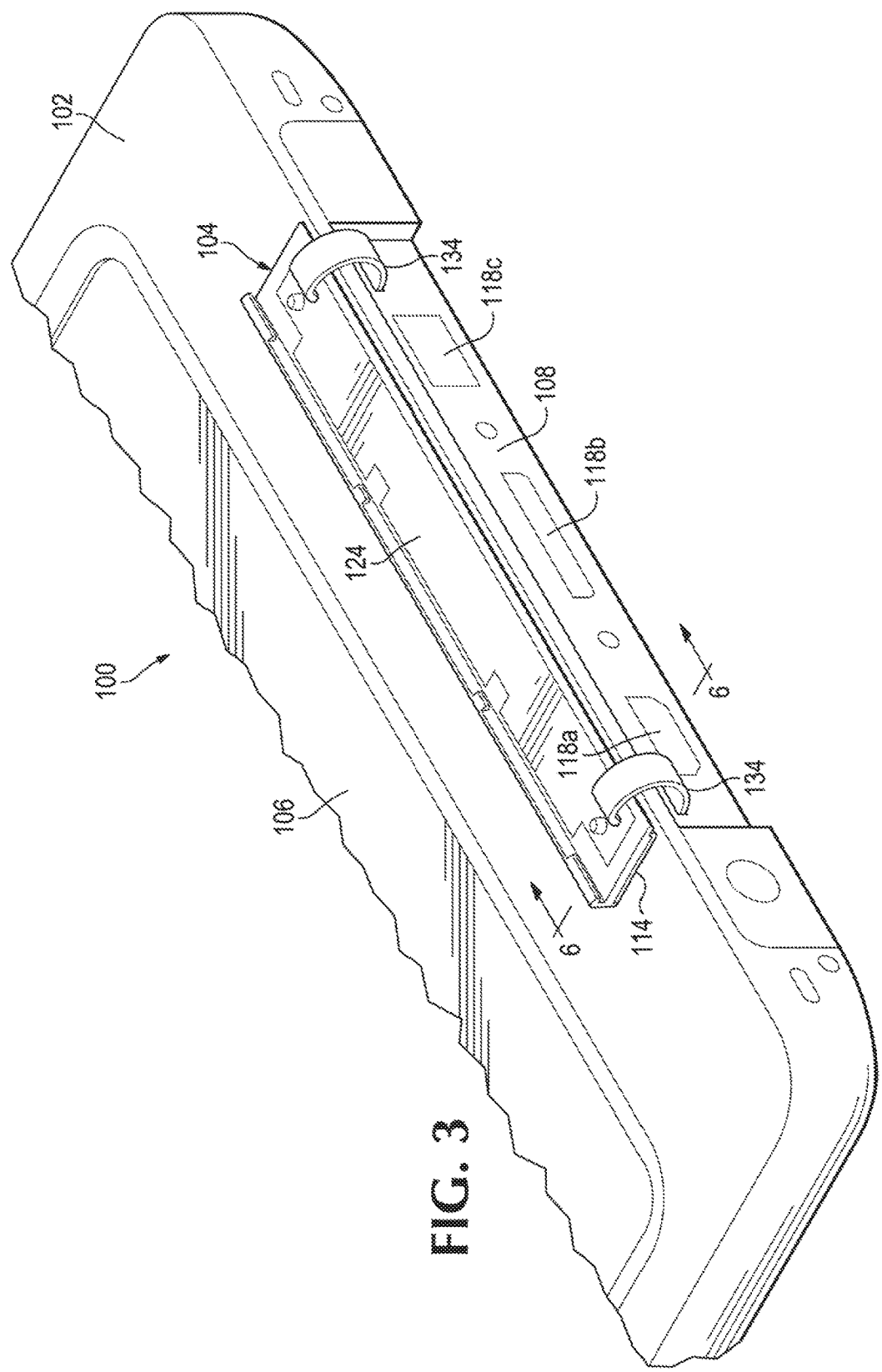
FIG. 3 illustrates a protective jacket for a portable computing device, according to an example.

FIG. 3 illustrates a protective jacket for a portable computing device, according to an example. In the example of FIG. 3, the cover 104 is in the open position (i.e., fully open), and stowed away on the surface of the jacket 102. Magnetic members and/or metallic members on the outer surface 114 of the cover 104 are magnetically attracted to magnetic members 112 disposed within the surface of the jacket 102, causing the cover 104 to snap onto the jacket 102.

When the cover 104 is in the opened position, the bottom sidewall 108 of the device 100 is exposed and the user may access connectors 118a-118c. Connectors 118a-118c may include USB ports, HDMI ports, power connector, audio connector, docking connector, etc. Inner portion 124 of the cover 104 can include rubber members such as rubber tabs (or any other suitable material) to seal, the connectors 118a-118c from external environment when the cover 104 is closed.

Cover 104 is adapted to move to the open position and the closed position while movably attached to the jacket 102 via a strap 134, as shown. In some examples, cover 104 can be movably attached to the jacket 102 via a hinge, or any other movable attachment. Strap 134 allows the cover 104 to be rotatably attached to the jacket 102 such that the cover 104 can be stowed on the surface of the jacket 102. Accordingly, strap 134 can be made of rubber, plastic, or any other suitable material.

In certain examples, the jacket 102 is removably attached to the device 100. In such an example, the device 100 can be separated or removed from the jacket 102 (e.g., with little or no effort). In other examples, the jacket 102 is integrated with the device 100. In such an example, the device 100 may not be separated from the jacket 102. In yet other examples, the device 100 may be separated from the jacket 102 using tools to separate the attachment of the device 100 to the jacket 102.

Figure 4:
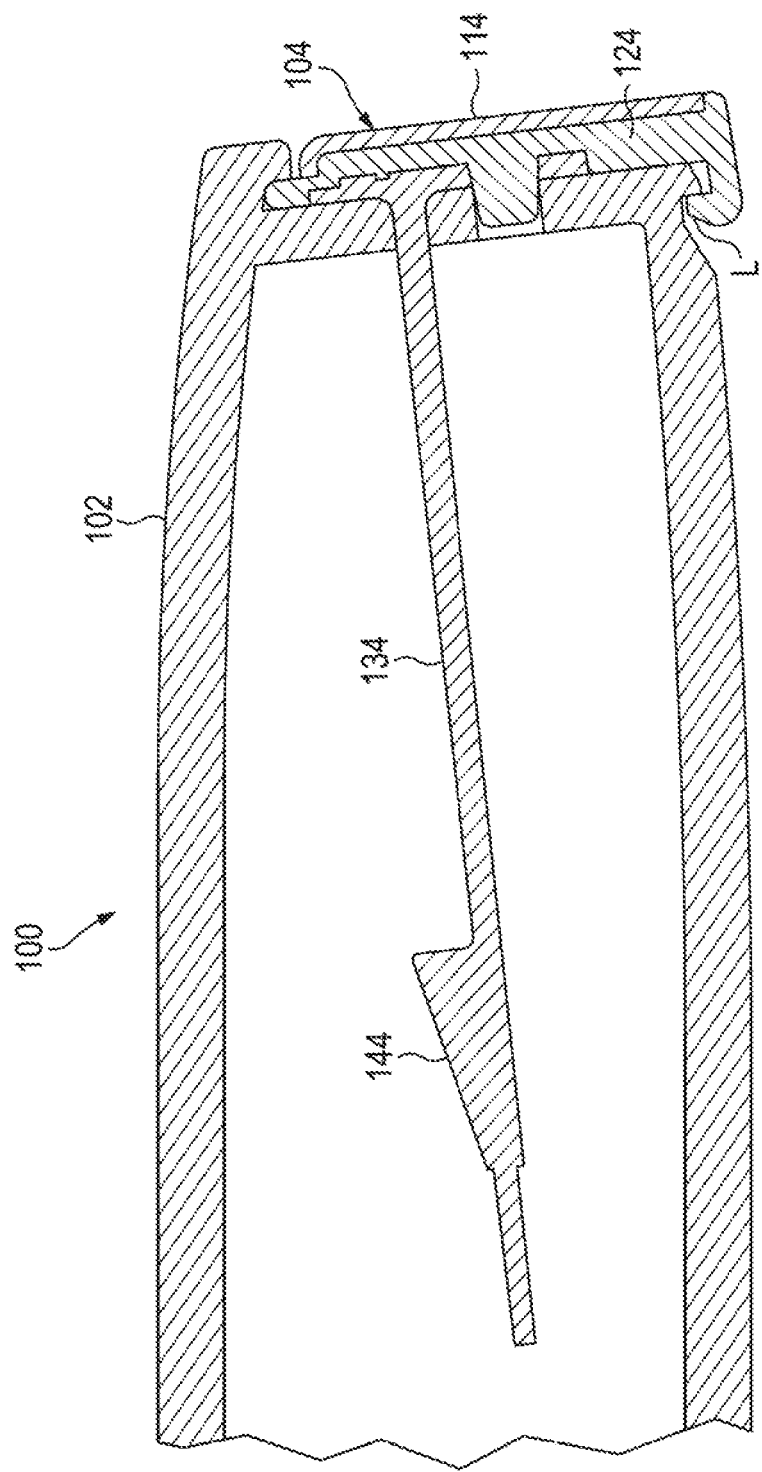
FIG. 4 illustrates a sectional view of a protective jacket for a portable computing device, according to an example.

FIG. 4 illustrates a sectional view of a protective jacket for a portable computing device, according to an example. In the example of FIG. 4, cover 104 is in the closed position to seal the connectors of the device 100 from external environment. In the closed position, cover 104 may clip, latch, hook, or lock, onto the jacket 102 at L so that the connectors of the device 100 are properly sealed. Thus, the user may press on the cover 104 until a clicking sound is heard or felt to ensure the cover 104 is properly closed. The sectional view of FIG. 4 also shows the strap 134 of the cover retracted inwards when the cover 104 is closed. Strap 134 includes a restraint 144 towards a tail end of the strap 134 to prevent the cover 104 from being completely detached from the jacket 102, such that the cover 104 is not separated from the jacket 102.

Figure 5:
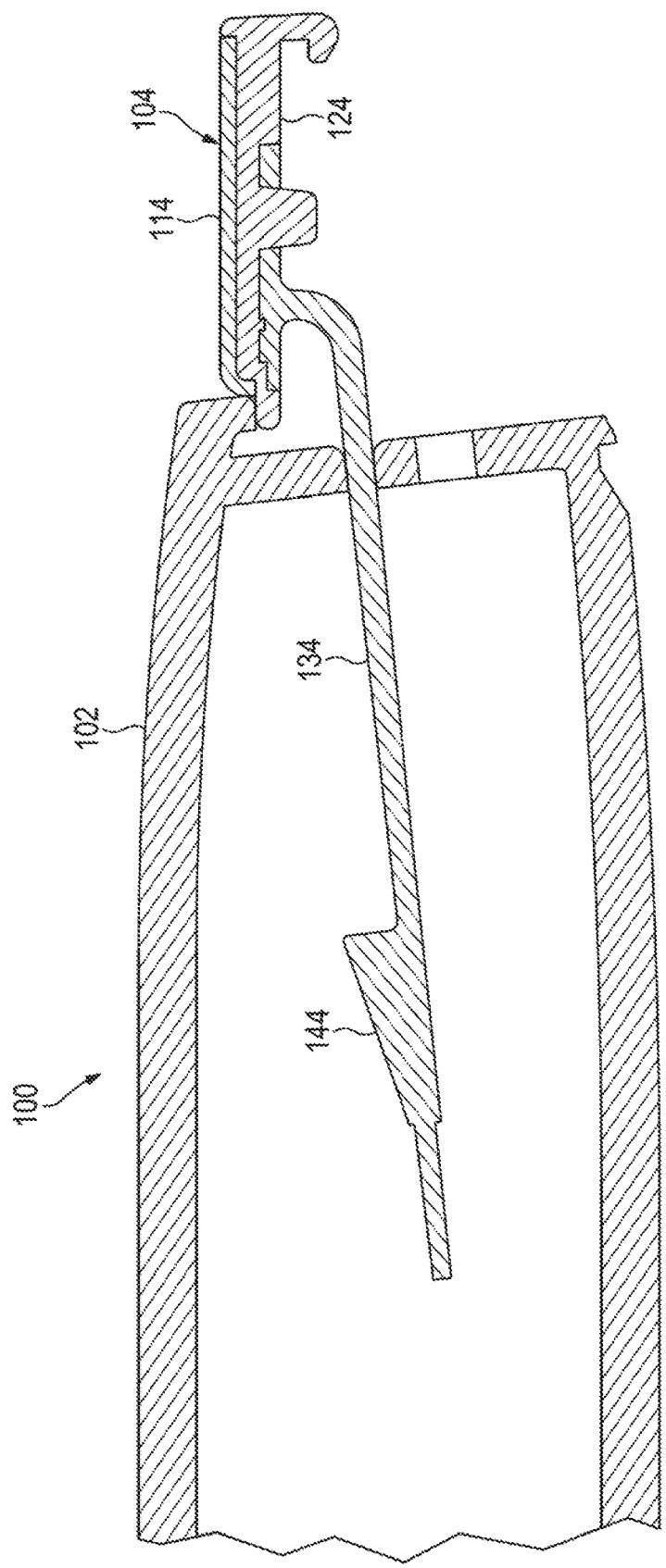
FIG. 5 illustrates a sectional view of a protective jacket for a portable computing device, according to an example.

FIG. 5 illustrates a sectional view of a protective jacket for a portable computing device, according to an example. In the example of FIG. 5, the cover 104 is partially open. Cover 104 is movably attached to the jacket via the strap 134. Strap 134 includes a restraining member 144 to prevent the cover 104 from being separated or detached from the jacket 102.

Figure 6:
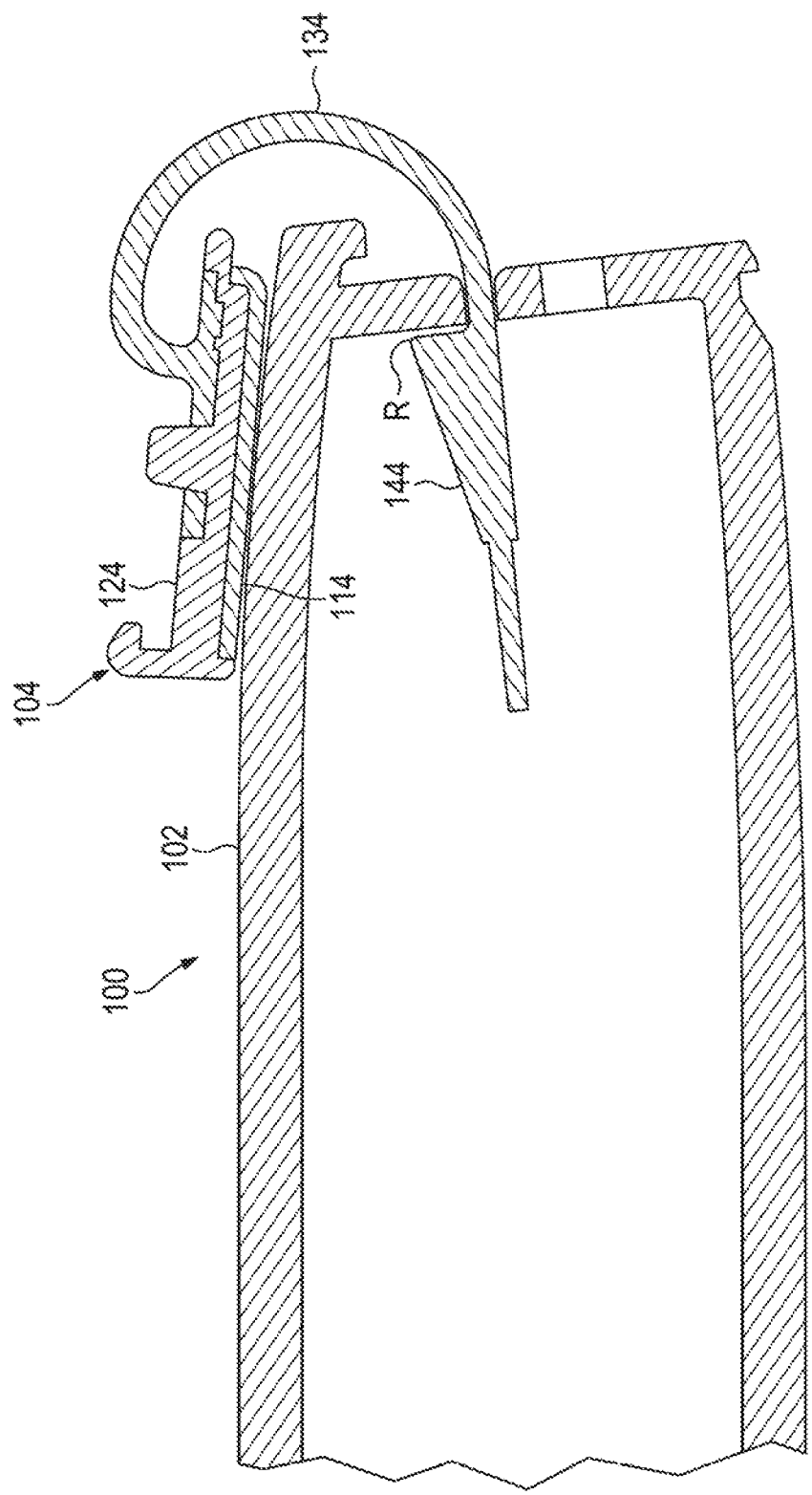
FIG. 6 illustrates a sectional view of a protective jacket for a portable computing device, according to an example.

FIG. 6 illustrates a sectional view of a protective jacket for a portable computing device, according to an example. In the example of FIG. 6, the cover 104 is in the open position (i.e., fully open), and stowed on the surface of the jacket 102. Magnetic and/or metallic members on fee outer surface 114 of the jacket 102 snap onto magnetic members disposed within the surface of the jacket 102. Restraining member 144 of the strap 134 prevents the cover 104 from being separated or detached from the jacket 102 at R. Strap 134 provides some flexibility such that the cover 104 move from the closed position to the open position while movably attached to the jacket 102.

Figure 7:
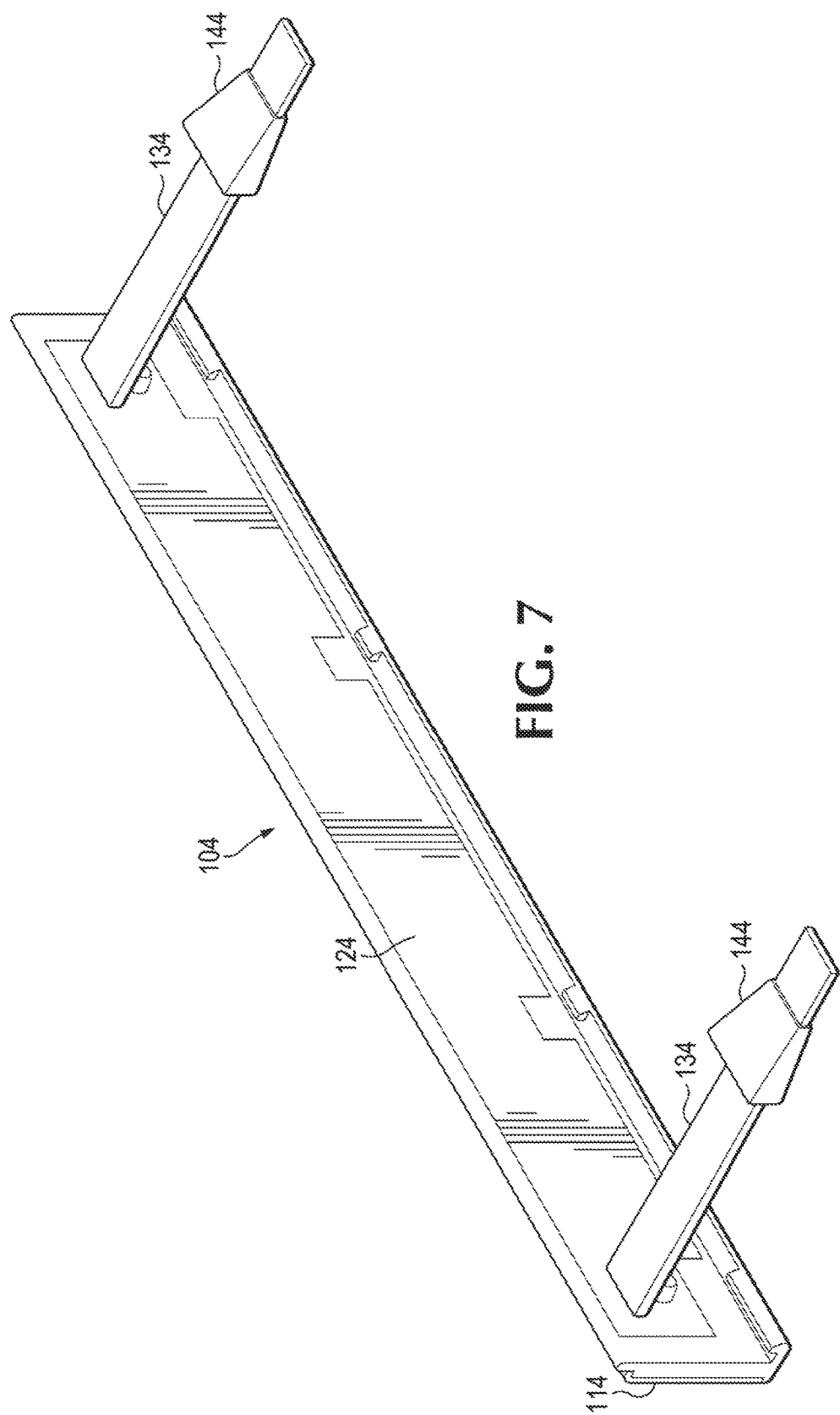
FIG. 7 illustrates a cover of the protective jacket, according to an example.

FIG. 7 illustrates a cover of the protective jacket, according to an example. Cover 104 includes an inner portion 124 to seal the connectors of the device 100 when the cover 104 is in the closed position. Inner portion 124 can be a rubber member or any other suitable material to seal the connectors from external environment such that the jacket 102 complies with at least an IP54 standard. Cover 104 also includes an outer portion 114 to magnetically couple to magnetic members disposed within a surface of the jacket when the cover 104 is in the open position. In one example, the outer portion 114 of cover 104 includes magnetic members that are in opposite polarity with the magnetic members of the jacket 102 to create a magnetic attraction between the cover 104 and the jacket 102. In another example, the outer portion 114 of cover 104 includes metallic members to create a magnetic attraction between the cover 104 and the jacket 102.

Cover 104 also includes a strap 134 located on the left side and the right side of the inner portion 124 to movably attach the cover 104 to the jacket 104. Strap 134 can be plastic, rubber, or any other flexible material to allow the rotation or movement of the cover 104 from the closed position to the open position while the cover 104 is attached to the jacket 102. Strap 134 can include a restraining member 144 at one end (i.e., the end that attaches to the jacket 102) to prevent the cover 104 from being detached from the jacket 102. It should be noted that in certain examples, cover 104 can be movably attached to the jacket via a hinge or any other attachment mechanism that slows the movement of the cover 104 from the closed position to the open position while attached to the jacket.

In the foregoing description, numerous details are set forth to provide an understanding of the present disclosure. However, it will be understood by those skilled in the art that the present disclosure may be practiced without these details. While the present disclosure has been disclosed with respect to a limited number of examples, those skilled in the art will appreciate numerous modifications and variations therefrom. It is intended that the appended claims cover such modifications and variations as fell within the true spirit and scope of the present disclosure.

What is claimed is:

1. A protective jacket for a portable computing device, the jacket comprising:
    a connector cover movably attached to the jacket for the computing device via a flexible strap, the connector cover comprising:
        an inner portion to seal a plurality of connectors of the device when the connector cover is in a closed position, wherein the connector cover includes a hook to couple the connector cover to the jacket for the computing device;
        the flexible strap located on a left side and a right side of the inner portion;
        a restraining member located on the flexible strap to prevent detachment of the connector cover from the jacket; and
        a magnetic outer portion to magnetically couple to magnetic members disposed within a display surface of the jacket when the connector cover is in an open position, wherein the restraining member located on the flexible strap allows the connector cover to remain attached to the jacket when the magnetic members detach from the magnetic outer portion.

2. The protective jacket of claim 1, wherein the inner portion includes a rubber member to seal the connectors from external environment.

3. The protective jacket of claim 1, wherein the magnetic outer portion includes at least one of a metallic member and magnetic members to create a magnetic attraction with the magnetic members disposed within the surface of the jacket when the connector cover is in the open position.

4. The protective jacket of claim 3, wherein the connector cover is stowed on the display surface of the jacket when the connector cover is in the open position as a result of the magnetic attraction.

5. The protective jacket of claim 1, wherein the connector cover is adapted to move to the open position and the closed position while movably attached to the jacket.

6. The protective jacket of claim 1, wherein the jacket complies with at least an Ingress Protection (IP) standard rating of IP54.

7. The protective jacket of claim 1, wherein the jacket is removably attached to the device.

8. The protective jacket of claim 1, wherein the jacket is integrated with the device.

9. A protective jacket for enclosing a back surface and sidewalls of a portable computing device, the jacket comprising:
    a connector cover movably attached to the jacket for the portable computing device via a rotatable strap, the connector cover comprising:
        an inner portion including a rubber member to seal a plurality of connectors on a sidewall of the device when the connector cover is in a closed position, wherein the connector cover includes a hook to couple the connector cover to the jacket for the computing device;
        the rotatable strap located on a left side and a right side of the inner portion, wherein the rotatable strap is rotatable more than 270 degrees relative to the inner portion of the connector cover;
        a restraining member located on the rotatable strap to prevent detachment of the connector cover from the jacket; and
        a magnetic outer portion including at least one of a metallic member and first magnetic members to magnetically couple to second magnetic members disposed within a display surface of the jacket when the connector cover is in an open position, wherein the restraining member located on the rotatable strap allows the connector cover to remain attached to the jacket when the at least one of the metallic member and first magnetic members cease being coupled to the second magnetic members.

10. The protective jacket of claim 9, wherein the rubber member of the inner portion of the connector cover includes rubber tabs to seal the plurality of connectors from external environment.

11. The protective jacket of claim 9, wherein the connector cover is movably attached to the jacket while the connector cover is in the open position and the closed position, and wherein the connector cover is movably attached to the jacket via at least one of a hinge and the rotatable strap.

12. A system comprising:
    a portable computing device including a display surface and a back surface opposite the display surface; and
    a protective jacket for the computing device enclosing at least the back surface and sidewalls of the device, the jacket comprising:
        a connector cover movably attached to a bottom portion of the jacket via a flexible strap, the connector cover comprising:
            an inner portion including a rubber member to seal a plurality of connectors on a bottom sidewall of the device when the connector cover is in a closed position;

the flexible strap located on a left side and a right side of the inner portion;

a restraining member located on the flexible strap to prevent detachment of the connector cover from the jacket, wherein the connector cover includes a hook to couple the connector cover to the jacket for the computing device; and a magnetic outer portion including at least one of a metallic member and a magnetic member to couple to magnetic members disposed within a display surface of the jacket when the connector cover is in an open position, wherein the restraining member located on the flexible strap allows the connector cover to remain attached to the jacket when the at least one of the metallic member and the magnetic member cease being coupled to the magnetic members disposed within the surface of the jacket.

13. The system of claim 12, wherein the at least one metallic member and magnetic member is to create a magnetic attraction with the magnetic members disposed within the surface of the jacket such that the connector cover is stowed on the surface of the jacket when the connector cover is in the open position.

14. The system of claim 12, wherein the inner portion of the connector cover is to seal the plurality of connectors from external environment when the connector cover is in the closed position.

* * * * *